United States Patent [19]

Schmittle

[11] Patent Number: 5,280,863
[45] Date of Patent: Jan. 25, 1994

[54] LOCKABLE FREE WING AIRCRAFT

[76] Inventor: Hugh Schmittle, 605 Carolyn Rd., Glen Burnie, Md. 21061

[21] Appl. No.: 795,329

[22] Filed: Nov. 20, 1991

[51] Int. Cl.$^5$ ............................................. B64C 3/38
[52] U.S. Cl. ................................... 244/48; 244/46
[58] Field of Search ................ 244/48, 46, 38, 75 R, 244/75 A

[56] References Cited

U.S. PATENT DOCUMENTS

| | | | |
|---|---|---|---|
| Re. 18,181 | 9/1931 | Stelzer | 244/38 |
| 1,016,929 | 2/1912 | Black | 244/38 |
| 1,771,257 | 7/1930 | Ingram | 244/48 |
| 1,772,586 | 8/1930 | Wilford | 244/37 |
| 1,845,307 | 2/1932 | Maxwell | 244/7 C |
| 1,861,336 | 5/1932 | Cox | 244/7 C |
| 1,906,005 | 4/1933 | Hall | 244/48 |
| 2,058,678 | 10/1936 | Fry | 244/19 |
| 2,063,030 | 12/1936 | Crouch | 244/12 |
| 2,066,649 | 1/1937 | Sabinss | 244/38 |
| 2,118,987 | 5/1938 | Smith | 244/48 |
| 2,347,230 | 4/1944 | Zuck | 244/82 |
| 2,362,224 | 11/1944 | Roseland | 244/48 |
| 2,580,312 | 12/1951 | Moore | 244/7 |
| 2,584,667 | 2/1952 | Bockrath | 244/75 R |
| 2,623,712 | 12/1952 | Spratt | 244/48 |
| 2,708,081 | 5/1955 | Dobson | 244/7 |
| 2,959,373 | 11/1960 | Zuck | 244/7 |
| 3,035,789 | 5/1962 | Young | 244/7 |
| 3,166,271 | 1/1965 | Zuck | 244/7 |
| 3,236,182 | 2/1966 | Dahm | 102/50 |
| 3,415,469 | 12/1968 | Spratt | 244/48 |
| 3,477,664 | 11/1969 | Jones | 244/48 |
| 3,561,702 | 2/1971 | Jones | 244/16 |
| 3,730,459 | 5/1973 | Zuck | 244/48 |
| 3,795,373 | 3/1974 | Gerard | 244/48 |
| 4,124,180 | 11/1978 | Wolowicz | 244/82 |
| 4,415,132 | 11/1983 | Shirk | 244/48 |
| 4,568,043 | 2/1986 | Schmittle | 244/48 |
| 4,596,368 | 6/1986 | Schmittle | 244/48 |
| 4,730,795 | 3/1988 | David | 244/6 |
| 4,928,907 | 5/1902 | Zuck | 244/6 |
| 4,967,984 | 11/1990 | Allen | 244/35 |
| 5,098,034 | 3/1992 | Lendriet | 244/39 |

FOREIGN PATENT DOCUMENTS

| | | | |
|---|---|---|---|
| 790597 | 11/1935 | France | 244/38 |
| 997796 | 1/1952 | France | 244/38 |
| 7209 | of 1909 | United Kingdom . | |
| 732657 | 6/1955 | United Kingdom . | |

OTHER PUBLICATIONS

NASA Contractor Report 2946, "Analytical Study of a Free-Wing/Free-Trimmer Concept," Porter et al., Feb. 1978, pp. v-115.

NASA Contractor Report 3135, "Extended Analytical Study of the Free-Wing/Free-Trimmer Concept," Porter et al., 1979, pp. iii-85.

*Primary Examiner*—Michael S. Huppert
*Assistant Examiner*—Anne E. Bidwell
*Attorney, Agent, or Firm*—Lowe, Price, LeBlanc & Becker

[57] ABSTRACT

The aircraft includes a free wing freely pivotally supported about a spanwise axis for flight in a free wing mode and lockable in selected predetermined, fixed angles of incidence with respect to a fuselage for flight in a fixed wing mode. The predetermined angle of incidence in the fixed wing flight mode is selected to provide sufficient lift for flying the aircraft at low speeds as necessary for takeoff and landing. The aircraft can be converted in flight between the free wing or conventional fixed wing aircraft flight modes. A control system is provided for selectively enabling or disabling the elevators on the horizontal stabilizer and the wing flaps.

22 Claims, 7 Drawing Sheets

LOCKABLE FREE WING AIRCRAFT

BACKGROUND OF THE INVENTION

The present invention generally relates to an aircraft having a wing free for rotation about a spanwise axis to maintain a constant angle of attack with the relative wind. More particularly, the present invention relates to a wing which is lockable and unlockable relative to the fuselage to selectively enable free rotation of the wing about the spanwise axis, and hence flight in a free wing mode, and fixation of the wing to the fuselage at a predetermined angle of incidence, and hence flight in a conventional fixed wing mode.

A free wing or "freewing" is a wing attached to an aircraft fuselage in a manner such that the wing is freely pivotable about its spanwise axis forward of its aerodynamic center. This arrangement enables the wing to have an angle of attack which is determined solely by aerodynamic forces, and therefore, subject only to aerodynamic pitching moments imposed by wing lift and drag. Rotation of the wing, without pilot intervention, induced by positive or negative vertical wind gusts striking the wing causes the angle of incidence or pitch between the wing and the aircraft fuselage to vary so that the wing presents a constant angle of attack to the relative wind enabling the aircraft to be essentially stall-free during flight.

Among other advantages realized when employing a freewing are increased resistance to stalls, increased C.G. (Center of Gravity) range, alleviation of gust loads, e.g. on the order of a 4:1 reduction, which translates to an increase in passenger comfort of up to 4,000% greater than conventional fixed wing aircraft, extension of the payload capability due to the ability to reduce the structural weight of the aircraft, and the ability to utilize a smaller engine with a lower fuel requirement, thus increasing the flight range of the aircraft.

Recognizing the advantages associated with freewings, numerous attempts have been made to adapt the concept of the freewing to conventional aircraft, particularly in the field of general aviation. However, as discussed below, the freewing concept has only been successfully applied to light or very light aircraft.

U.S. Pat. No. 4,596,368, issued to the present inventor is directed to an ultra-light aircraft wherein a hang cage is suspended from a collapsible Rogallo type wing by a main hinge assembly. The wing includes a longitudinal keel of light-weight tubular construction, leading edge members, and a cross brace. A flexible lifting panel is secured along and between these members to establish a lifting surface. The hinge is clamped to the keel permitting free rotation of the wing about a spanwise axis extending longitudinally through the cross brace.

U.S. Pat. No. 4,568,043, also issued to the present inventor, is directed to an ultra-light aircraft of light-weight construction which includes a freely rotating rigid wing from which a hang cage is suspended by a main hinge assembly Although the freewing concept has been successfully applied to ultra-light aircraft by the present inventor and to a light plane water-borne aircraft, the application of the freewing concept to conventional aircraft, particularly in the field of general aviation, has not been successfully achieved due to the fact that not only is drag increased as a consequence of the flap deflection needed to properly vary the coefficient of lift of the wing, but in addition, deploying flaps on a freewing can induce instability of the wing by changing the pitching moment of the airfoil from a positive value, needed for stable freewing flight, to a negative value. This characteristic of freewings becomes particularly significant when an aircraft is on final approach and/or during takeoff, as can readily be appreciated by those familiar with the handling of aircraft in flight.

Aircraft such as ultra-lights can ignore the problem associated with low wing lift coefficient, because they are inherently so low wing loaded that they can fly at speeds slow enough to take off and land safely. However, without some method of inducing a freewing into higher lift coefficients than possible in the pure freewing, larger size freewing aircraft are not easily attainable.

Solutions proposed and explored in NASA-funded studies include (i) using leading edge slats instead of trailing edge flaps and (ii) using a freewing free-trimmer, a device resembling a canard surface protruding from the wing ahead of the leading edge, supported by booms, as well as an alternative version of the freewing free-trimmer, in which the control surfaces were moved from the canard position to a trailing edge location.

The proposed use of leading edge slats was determined to be structurally over-complicated and otherwise did not provide the required lift coefficient additive. The proposed use of a freewing free-trimmer was the subject of two further NASA-funded studies. In one of these further studies, NASA CR-2946, Analytical Study of a Free-Wing/Free-Trimmer Concept (1978), it was found that while there was some additional lift force possible with aft mounted trimmers, they required additional mass penalty to balance the freewing about its hinge line. Moreover, it was found that while forward mounted (canard) trimmers would themselves serve as the required counterweight, they also counteracted the gust alleviation qualities of the freewing to the extent that such a freewing would provide an even rougher ride in turbulence than its conventional counterpart, thus destroying one of the desired benefits of the freewing.

A number of U.S. patents involving freewing and freewing-like designs have issued. For example, U.S. Pat. No. Re. 18,181 to Stelzer discloses a type of freewing which includes a means to provide elastic shock absorption.

U.S. Pat. No. 3,415,469 to Spratt, builder of the aforementioned aircraft, discloses a freewing type aircraft in which the pitch of the wing is controlled by the pilot through control stick 46 or control wing 31. In operation, control rods 42 and 43 impart a torque about the wing hinges such that the wing assumes a higher angle of attack while still remaining largely free to rotate in response to gusts.

U.S. Pat. No. 4,124,180 to Wolowicz discloses a freewing aircraft which incorporates a trimmable free stabilizer comprising a floating canard mounted on a strut rigidly connected to the freewing.

The present invention involves a revolutionary new approach to the problem of how to incorporate the freewing concept to aircraft of any size.

SUMMARY OF THE INVENTION

In accordance with the present invention, there is provided an aircraft having a wing attached to a fuselage in a manner such that the wing is freely pivotable about its spanwise axis forward of its aerodynamic center and hence may operate in one flight mode as a freewing, together with a means for locking the wing at a predetermined angle of incidence such that the aircraft may be operated conventionally in a fixed wing flight mode. Ideally, when operating in the freewing mode, the wing is freely pivotable relative to the fuselage and, when operating in the fixed wing mode, the wing is rigidly locked against pivotal movement relative to the fuselage. Thus, in the freewing mode, no resistance to pivotal movement is afforded by the fuselage or the locking mechanism which acts between the wing and fuselage when the aircraft operates in the fixed wing mode.

In another embodiment, the aircraft in the freewing flight mode may have slight damping forces applied to the wing by the locking mechanism cooperable between the wing and the fuselage. Also, the locking mechanism, when the wing is locked to the fuselage for operation in the fixed wing mode may provide very large damping forces between the wing and fuselage such that pivotal movement between the wing and fuselage in the fixed wing flight mode occurs only in response to very large forces acting on the wing tending to rotate the wing relative to the fuselage.

In accordance with another aspect of the present invention, there is provided a control system for disengaging the elevators of the horizontal stabilizer, while maintaining control of the wing flaps while operating in a freewing flight mode. Conversely, the wing flaps may be disengaged and the elevators engaged when the aircraft is operating in the fixed wing flight mode.

Accordingly, it is a primary object of the present invention to provide an improved freewing aircraft.

It is another object of the present invention to provide an improved freewing aircraft characterized by a higher lift coefficient during periods of slow flight.

It is a further object of the present invention to provide a freewing aircraft having a freewing which is selectively lockable in a fixed angle of incidence to provide a fixed wing flight mode and unlockable to provide a freewing flight mode.

A still further object of the present invention is to provide a means for locking a freewing in a selective fixed angle of incidence.

Yet another object of the present invention is to provide freewing locking means which allows a higher fixed-wing angle of incidence than is possible in a conventional fixed wing aircraft so that desired short-takeoff-and-landing (STOL) characteristics may be obtained without degrading the aircraft's high speed flight characteristics.

A still further object of the present invention is to provide an aircraft which selectively operates as either a conventional fixed wing aircraft or as a freewing aircraft.

It is yet a further object of the present invention to provide a method of selectively transforming an aircraft for flight in a freewing mode and in a conventional fixed wing mode.

It is yet a further object of the present invention to provide a method for selectively locking a freewing in a fixed angle of incidence.

In a preferred embodiment according to the present invention, there is provided an aircraft comprising a fuselage, a wing having an aerodynamic center and connected to the fuselage for free pivotal movement about a spanwise axis forwardly of the aerodynamic center and means for selectively locking the wing at a predetermined angle of incidence with respect to the fuselage.

In a further preferred embodiment according to the present invention, there is provided an aircraft comprising a fuselage, a wing having an aerodynamic center and connected to the fuselage for free pivotal movement about a spanwise axis forwardly of the aerodynamic center and a locking mechanism for selectively locking the wing at a predetermined angle of incidence with respect to the fuselage, the locking mechanism including a damper for damping the pivotal movement of the wing relative to the fuselage, the wing being otherwise freely pivotal relative to the fuselage in response to forces external to the aircraft acting on the wing.

In a further preferred embodiment according to the present invention, there is provided an aircraft having a free wing flight mode, a method for selectively adjusting the lift coefficient of the wing during the free wing flight mode comprising the step of locking the free wing in a predetermined angle of incidence.

These and further objects and advantages of the present invention will become more apparent upon reference to the following specification, appended claims and drawings.

BRIEF DESCRIPTION OF THE DRAWING FIGURES

The present invention will hereafter be described with reference to the annexed drawings, which are given by way of non-limiting examples only. Throughout the drawings, like elements are identified by similar reference numerals wherever possible. In the drawings.

DETAILED DESCRIPTION OF THE DRAWING FIGURES

In contrast to previous attempts aimed at modifying freewing aircraft to provide greater lift coefficients by adapting various structural devices to the freewings, the present invention provides methods and apparatus for effectively transforming a freewing aircraft into a conventional fixed wing aircraft and vice versa, and for controlling the aircraft suitably for effecting this transformation. Thus, according to the present invention, the pilot of an aircraft 1 employing the present invention as depicted in FIG. 1 can effectively transform the aircraft to a fixed wing aircraft in order to provide necessary lift coefficients at slower speeds, e.g., takeoff and landing, corresponding to those required by conventional fixed wing aircraft Likewise, once the aircraft is airborne, the pilot can effectively transform the aircraft into a freewing aircraft so as to incorporate the above enumerated and other advantages associated with freewings.

Figure 1:
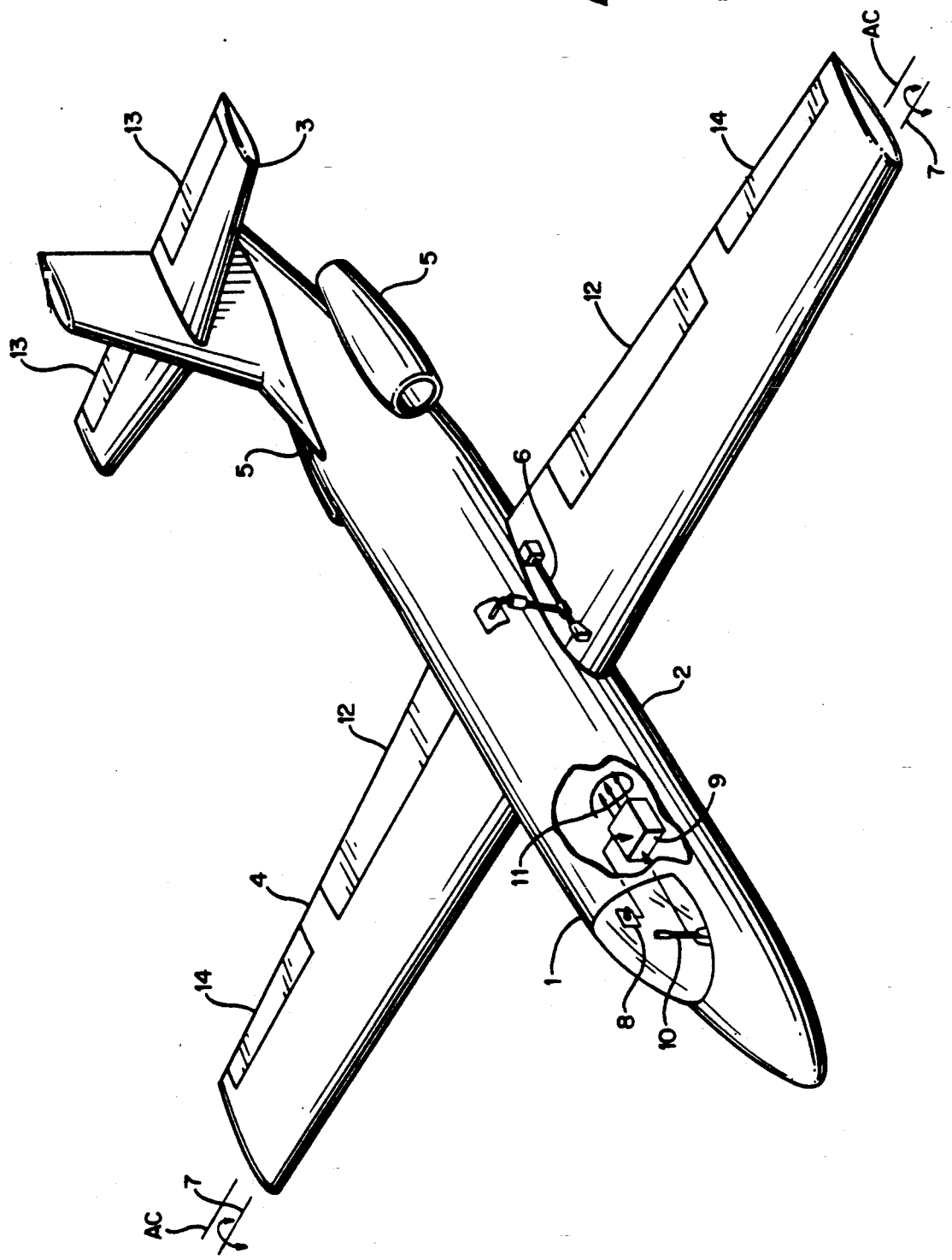
FIG. 1 is a perspective schematic view of an aircraft employing a freewing locking device according to the present invention.

As depicted in FIG. 1, aircraft 1 is generally of a conventional design and includes a fuselage 2, tail section 3, wing 4, and engines 5 on opposite sides of the fuselage. According to the present invention, wing 4 is a freewing to which is attached a locking means 6 shown schematically. Although FIG. 1 depicts an embodiment of the present invention in which the locking means 6 is located above the wing 4, it will become clear as the description of the present invention unfolds, that the locking means 6 could easily be located below the wing 4.

The present invention makes use of a conventional freewing design wherein the wing 4 is free to rotate or pivot about its spanwise axis 7 forward of its aerodynamic center AC. In order to transform or convert the aircraft from a freewing aircraft into a conventional fixed wing type aircraft, the present invention provides a device 6 having a locking or motion damping mechanism which, when activated or engaged, provides large forces which must be overcome if the wing is to pivot about axis 7. These forces may be made sufficiently large so that the wing is effectively, if not actually, locked in a predetermined angle of incidence, e.g., an angle of incidence which provides a sufficient lift coefficient for takeoff and/or landing, even of aircraft having high wing loadings. When the locking mechanism is deactivated or in the unlocked position, the wing 4 becomes a pure freewing for all practical purposes.

In order to avoid departing from the type of conventional operation associated with fixed wing aircraft, the freewing locking mechanism is designed so that it may be activated simultaneously while activating conventional flaps and elevators which are required for fixed wing aircraft Thus, for example, a single control lever or switch 8 may be located in the cockpit which activates and deactivates the freewing locking mechanism and conventional flaps and elevators which are required for fixed wing aircraft. This feature of the present invention is significant since it prevents pilots from having to go through additional and/or unfamiliar or complicated procedures during landings and takeoffs.

A more detailed discussion of the pilot's controls relating the present invention is found hereinbelow. Broadly, apparatus, schematically illustrated at 9 in FIG. 1, receives commands from a control stick 10 or other pitch control and the control lever or switch 8 and generates signals 11 to control the position of the flaps 12, elevator 13 and ailerons 14 and the state of the locking mechanism 6, i.e., locked or unlocked. Such apparatus may comprise a processor of the type conventionally used in fly-by-wire control systems or a mechanical connecting apparatus such as the selective coupling apparatus discussed hereinbelow and illustrated in FIGS. 13-16.

Figure 2:
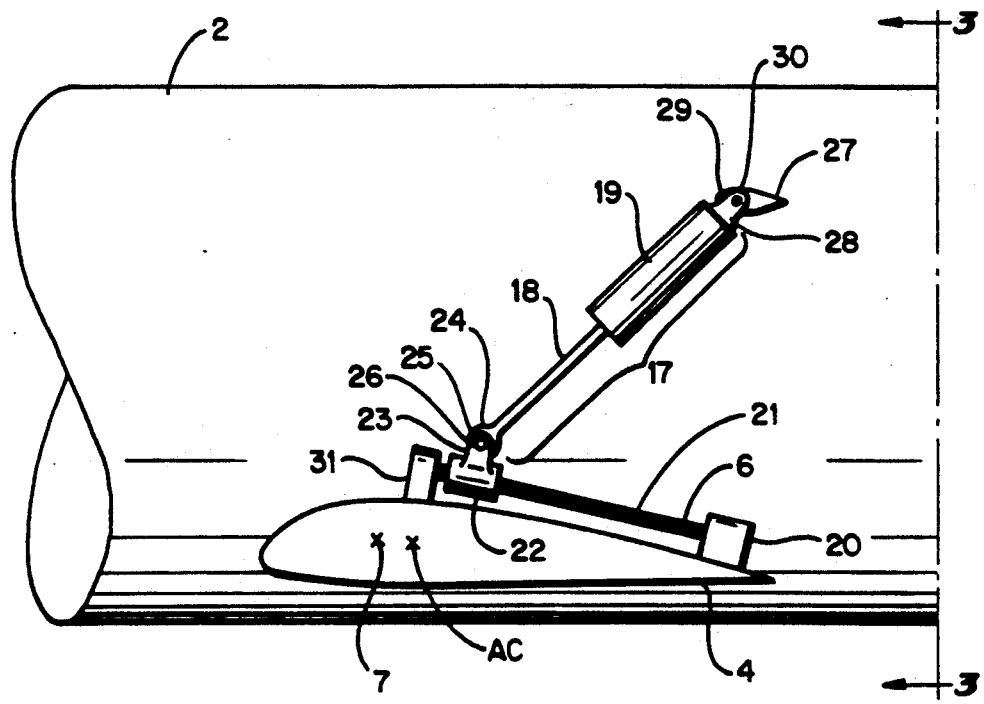
FIG. 2 is a fragmentary enlarged side elevational view of the aircraft of FIG. 1 illustrating the freewing locking device thereof.
Figure 3:
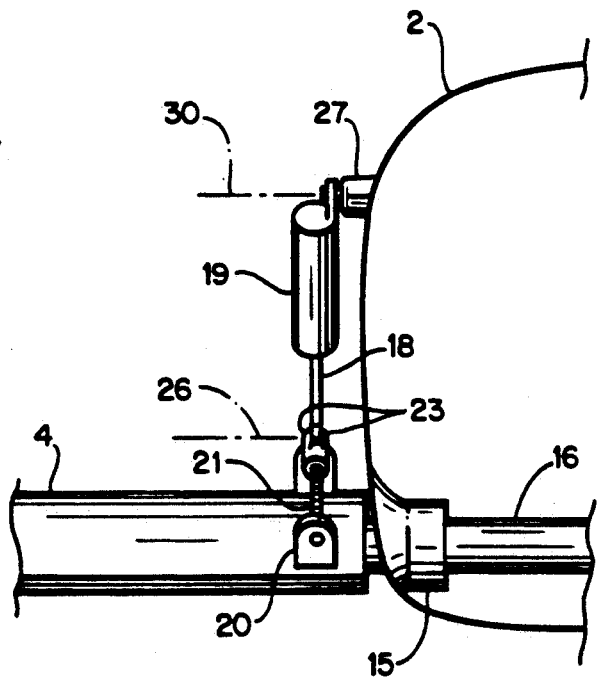
FIG. 3 is a rear schematic cross-sectional view thereof taken about on line 3—3 of FIG. 2.

As illustrated in FIGS. 2 and 3, wing 4 is mounted on fuselage 2 by means of elements shown in these Figures so that wing 4 will freely respond to moments applied to the wings about axis 7 in accordance with aerodynamic loading of the wing, when in a free wing mode, and those forces, together with other forces generated by the fuselage and control surfaces acting on the wing when operating in a fixed wing mode. Thus, a wing support bearing 15 mounts the wing spar 16 so that the wing is constrained to a pivoting motion about axis 7 in the free wing flight mode. There is also provided a wing pivot locking mechanism 6 and aerodynamic control surfaces on the wing such as ailerons 14 and flaps 12 (FIG. 1). The angle of the wing at any given instant will be a function of the settings of the control surfaces, the relative wind, the wing inertia and the forces, if any (and ideally none), transmitted from the fuselage through the wing support bearings 15 and wing pivot locking mechanism 6. It will be understood that aerodynamic control surfaces other than flaps and ailerons could be used.

The locking means in this embodiment includes a jackscrew and variable length link 17 comprising rod 18 and damper 19 comprised of a fluid, preferably hydraulically, actuated cylinder The jackscrew comprises a wing mounted motor and rear support 20 which drives and supports a threaded rod 21 onto which an internally threaded shuttle block or travelling nut 22 is threaded. The travelling nut 22 is pivotally joined to rod 18 by ears 23 which extend from nut 22 and a cooperating tang 24 located at the end of rod 18. The ears 23 and tang 24 are connected by a bolt 25 which passes through aligned apertures in the ears 23 and tang 24 and defines a pivot axis 26. The variable length link 17 including rod 18 in turn is connected through damper 19 to a pivot connection on fitting 27 mounted on fuselage 2. A bolt 29 passing through an aperture in a tang 28 affixed to and extending from the end of damper 19 may be screwed into fuselage fitting 27 thus providing a pivot joint between link 17 and fuselage 2. The axis of the pivot joint is identified in FIGS. 2 and 3 as pivot axis 30.

As will be apparent, actuation of motor 20 will rotate screw 21 causing the shuttle block or travelling nut 22 to travel axially along screw 21. The line of action will be co-linear with the link 17 and thus defined by the line connecting the pivot axes 26 and 30. As will be apparent, the line of action will be pivoted about axis 30 by moving the shuttle block or travelling nut 22.

Figure 4:
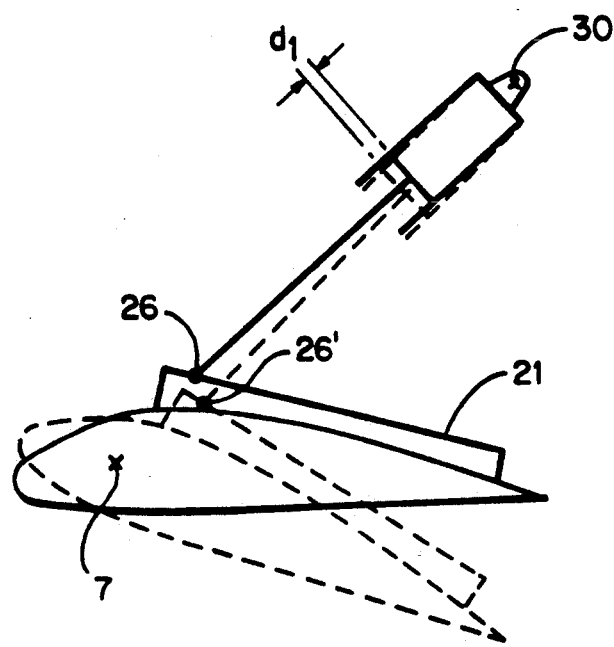
FIG. 4 is an enlarged schematic view of the freewing locking device depicted in FIG. 1 and illustrating the geometry of the device in its unlocked condition.
Figure 5:
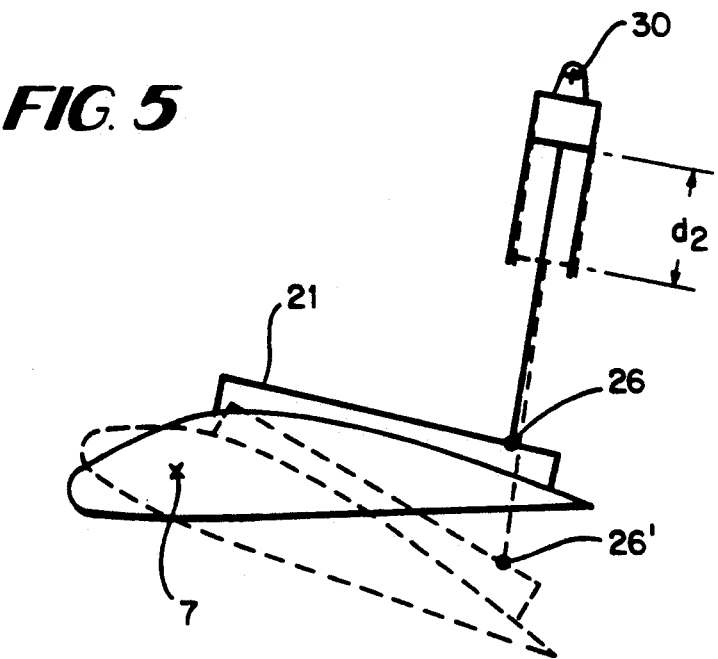
FIG. 5 is a view similar to FIG. 4 illustrating the geometry of the freewing locking device in its locked condition.

The significance of shifting this line of action will become apparent by considering FIGS. 4 and 5 which illustrate the geometry of the various axes and the line of action of the link 17 which are present when the wing locking mechanism is in the unlocked FIG. 4) and locked (FIG. 5) positions. In FIG. 4, it will be seen that the changes in distance between the two pivot axes 26 and 30 which occur for some particular or prescribed change in wing pivot angle are strongly dependent on the setting of the pivot locking mechanism 6, i.e., the damper 19 elongates and/or shortens much further for a given pivotal movement of the wing 4 when the pivot locking mechanism 6 is in the locked position in comparison to length change of the damper 19 when the mechanism is in the unlocked position. If the damping force is assumed to be proportional to the rate of change of the length of the damper, as generally characterizes hydraulic dampers, i.e., hydraulic cylinder/piston assemblies, the damping forces may easily be changed by a factor of 10, 20 or more for a given wing pivot motion by locking or unlocking the pivot locking mechanism 6, assuming the same time is required for executing the prescribed change in wing pivot angle. Since it is the sum of the moments about axis 7 which determines the pivoting motion of wing 4, it is the moment generated by the force acting through the link 17 which needs to be considered when comparing the movement of the wing in the locked and unlocked positions. The geometry indicated in FIG. 4 shows that the projected lever arm of the line of action of link 17 about axis 7 is small or even essentially zero when the pivot locking mechanism is unlocked, in contrast to the projected lever when the mechanism is in the locked position. It will thus be seen that the damping moment about axis 7 created by the damper in response to the pivoting movement of the wing may vary greatly: Using the geometry indicated in FIG. 5, the damping moment for the wing in the locked position can be easily two orders of magnitude greater than the damping moment for the wing in the unlocked position due to the increased moment arm and increased motion of the damper 19 associated with pivoting motion of the wing when the wing is in the locked position Ideally, the damping moment in the unlocked condition of the wing is zero.

In FIGS. 4 and 5, the solid lines indicate the position of various elements when the wing is at one angle of incidence with respect to the fuselage 2 while the dashed lines show the position of the same elements when the wing is at a positive 20 degree angle of incidence with respect to fuselage 2 FIG. 4 shows the freewing lock mechanism elements disengaged, that is, in the freewing state, while FIG. 5 shows the wing pivot locking mechanism in its wing locked configuration. A comparison of the motion of piston 32 within cylinder 33 of the damper 19 shows the piston motion to be significantly greater in the wing locked state for the prescribed 20 degree variation in angle of incidence It will be understood that a negative change of angle of incidence with respect to the fuselage 2 will also result in less piston motion in the unlocked state of FIG. 4.

Since the forces acting through the damper 19 will be acting in line with the wing pivot axis 7 when the wing pivot lock mechanism 6 is unlocked, the wing structure and support for the jackscrew must be robust. A support for the end of the screw 21 opposite from the jackscrew motor 20 is conveniently provided by a front bearing 31 (FIG. 2).

A selectively actuable positive mechanical lock may be incorporated into the damper 19 or otherwise in the link 17 if an infinite damping moment, i.e., a rigid lock, is desired It will be appreciated that the incompressible fluid used in the cylinder 19 may provide the rigid lock.

Although the positioning means depicted in FIG. 2 utilizes a jackscrew mechanism comprising a motor 20 to rotate a threaded rod engaging a threaded shuttle block or travelling nut 22, it will be understood that other known equivalent means might be used, such as, for example, a notched rod or gear rack used in place of threaded rod 21 which rack is engaged by a motor driven spur gear carried on the end of rod 18.

Various devices might be used in place of a simple hydraulic damper such as a damper having characteristics which vary in a predefined and desired manner as a function of the elongation of the damper, a damper having internal valves which are under remote control to vary the damping characteristics, a hydraulic damper combined with a hydraulic cylinder, position locks, springs, etc. The damper may also be designed to permit "bottoming out" when the damper is at its minimum and/or maximum extension lengths. Means to adjust the length of the rod 18 might also be provided.

FIG. 3 shows one wing support means which allows the desired wing pivot motion The pivot axis 7 is located with proper consideration to the aerodynamic center of the wing and, as noted above, is preferably located ahead of the wing aerodynamic center AC (FIG. 2). In FIG. 3, wing spar 16 extends through a bearing 15 which is mounted on the fuselage 2 so that the wing forces of lift, drag, weight, etc., but excluding those forces which may be resolved into a moment acting about wing pivot axis 7, are transmitted from the wing spar 16 through bearing 15 to the fuselage 2.

It will be apparent that the proportions of the elements in the embodiment shown in the Figures may be varied in accordance with engineering practice and requirements. It would be possible to locate the wing pivot axis 7 relative to the fuselage 2 so that the axis 7 is located in a blister on the fuselage belly, and passes through the lower part of the fuselage 2 as shown in FIGS. 2 and 3, or the middle of the fuselage 2, etc. It is also possible to locate the pivot axis so that it passes through the top of the fuselage 2 as shown in FIG. 6, this being a "high wing" configuration.

Figure 6:
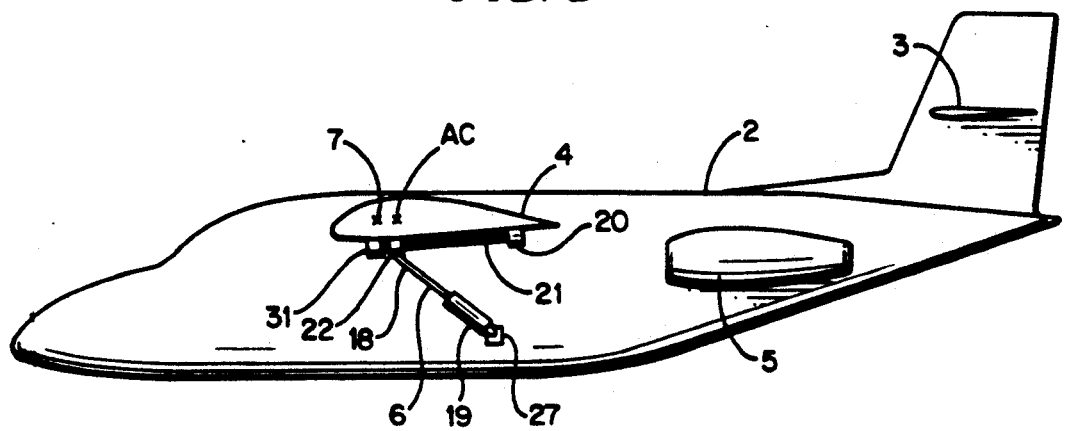
FIG. 6 is a side elevational view of an aircraft illustrating a freewing locking device according to a second embodiment of the present invention.

In FIG. 6 a wing pivoting locking mechanism 6 substantially similar to that depicted in FIG. 2 is employed in an aircraft in which the wing is attached on an upper portion of the fuselage 2. The embodiment of the wing pivoting locking mechanism 6 depicted in FIG. 6 is essentially the same as that depicted and described in FIGS. 2-5, the only difference being that the wing pivoting locking mechanism 6 has an orientation which is "upside down,", i.e., inverted, relative to that depicted in FIGS. 2-5 and is located beneath the wing 4. Otherwise, the elements and operation are essentially the same as discussed above in reference to FIGS. 2-5.

Figure 7:
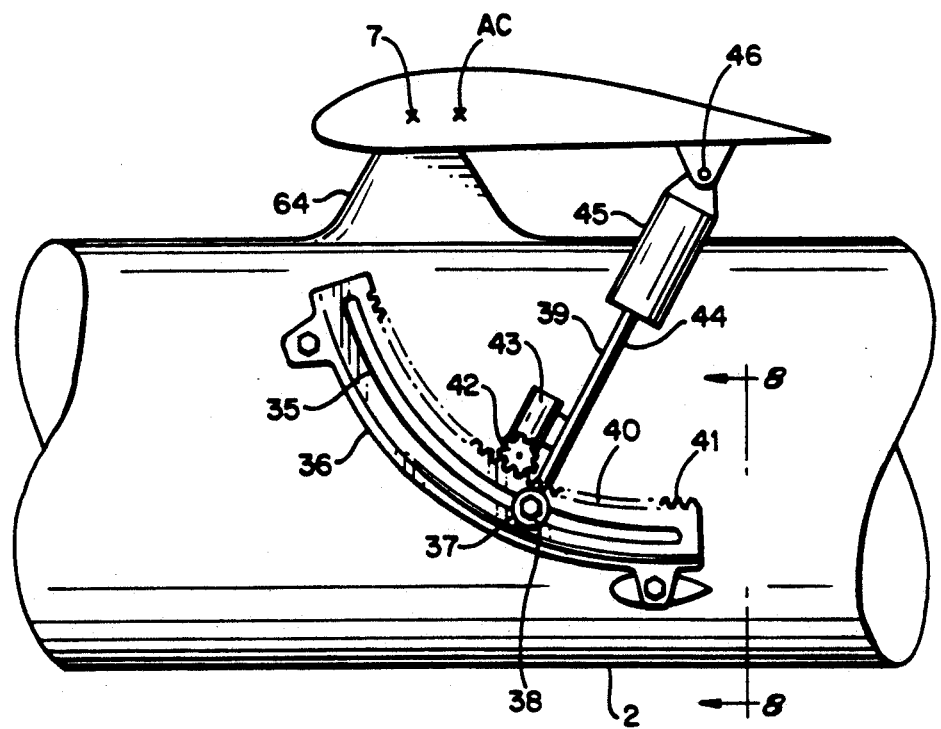
FIG. 7 is a side elevational view of an aircraft employing a freewing locking device according to a third embodiment of the present invention.
Figure 8:
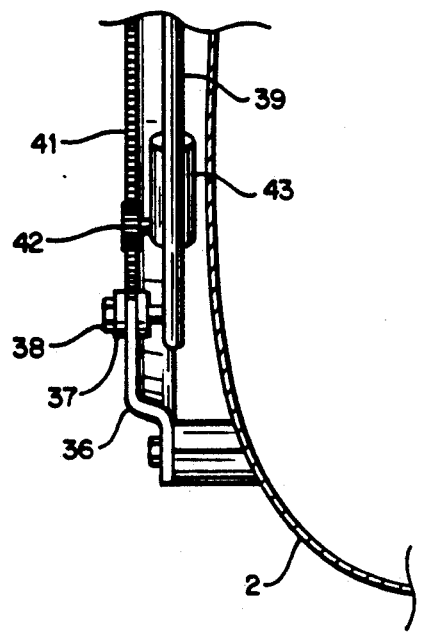
FIG. 8 is a fragmentary end elevational view of the embodiment illustrated in FIG. 6 as viewed along line 7—7 in FIG. 7.

In FIG. 7, wing 4 is pivotally mounted on pylon 64 which in turn is mounted on and extends upwardly from the fuselage 2. A follower engaged and is guided by the slot 35 in sector 36 which is mounted on the fuselage 2. The follower comprises a roller 37 which is mounted on a bolt 38 which bolt is threaded into an extension of the rod 39. The inner radius 40 of the sector 36 is provided with gear teeth 41 which are engaged by spur gear 42. Spur gear 42 is rotationally driven by motor 43, and gear 42 and motor 43 are mounted on the rod 39. It will be seen that the activation of the motor 43 will rotate spur gear 42 causing the rod 39 and the variable length link 44, including damper 45, to rotate about pivot 46.

The path along which follower 34 moves is determined by the shape of slot 35. The path may be selected to provide desirable characteristics to the wing pivoting locking mechanism and may be based on a circle, parabola, hyperbola or any curve deemed desirable. The circular slot path as shown in FIG. 7 will provide one particular schedule of change of damping characteristics between the wing locked and wing unlocked positions.

While the discussion of the present invention has been directed to locked and unlocked freewing operations, it may be desirable to operate a freewing aircraft with the lock mechanism in an intermediate position under certain flight conditions. In any case, the locking mechanism necessarily passes through intermediate positions in transitioning between the locked and unlocked states and the various elements are designed in consideration of the stresses and conditions that occur throughout the flight.

Figure 9:
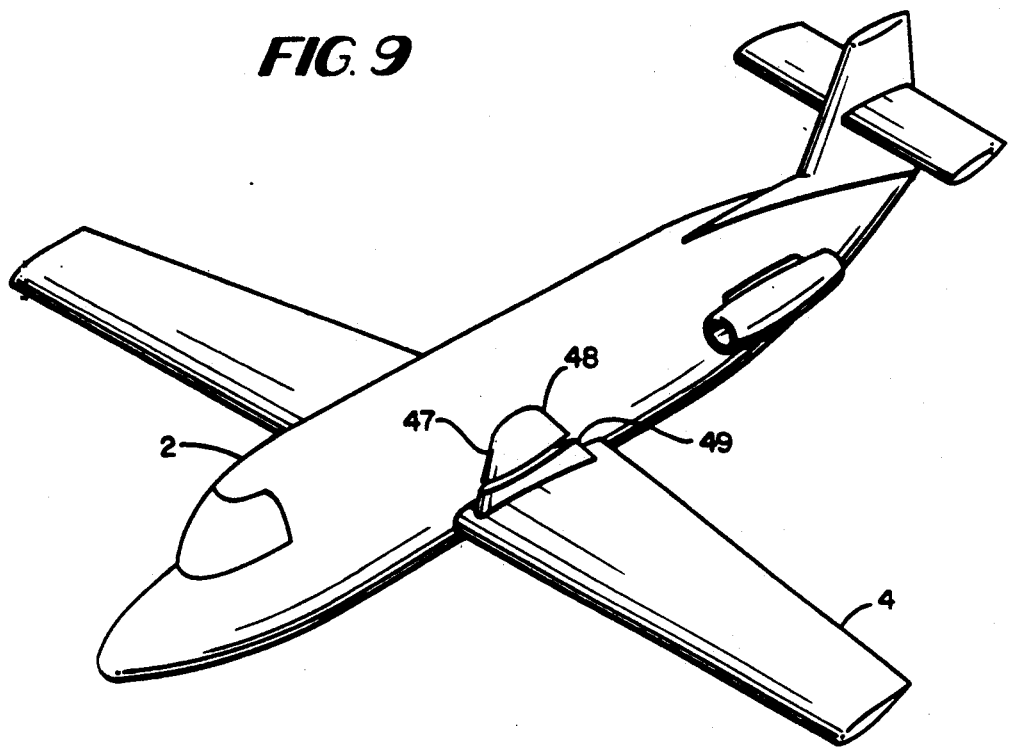
FIG. 9 is a perspective view of an aircraft illustrating aerodynamic fairings covering the freewing locking device.

In order to avoid departing from conventional designs of fixed wing aircraft, the freewing locking device is designed to be inconspicuous or otherwise may be concealed by a suitable fairing. Thus, FIG. 9 is a side elevational view of an aircraft employing a freewing locking device according to an embodiment of the present invention illustrating an optional fairing or blister 48 on fuselage 2 and fairing 49 on the wing 4 which covers the freewing locking device and jackscrew respectively. The design of the fairing could obviously be one which blends in with the overall appearance of the aircraft As shown in FIG. 9, a fuselage mounted fairing 48 and wing mounted fairing 49 generally enclose the wing pivot locking mechanism. Since the wing 4 and fuselage 2 move relative to each other, the upper and lower fairing portions 48 and 49 will also move relative to each other. The fairings may be designed to have overlapping portions or an elastic web stretched between the fairings so that there will be a continuous aerodynamic surface extending between fairing portions 48 and 49.

Since a freewing aircraft uses the flaps and/or ailerons on the main wing to control the pivot angle of the main wing and thus control the aircraft lift, it is necessary to provide an alternate means for longitudinal control, e.g., lift control, when the wing pivot locking mechanism is engaged. Like conventional aircraft, a freewing has a horizontal stabilizer 3 to stabilize the fuselage in the air stream. As shown in FIG. 1, horizontal elevators 13 are provided in the horizontal stabilizer 3 so that the aircraft pitch may be controlled when the wing 4 is locked.

It is desirable that the elevators be disengaged and locked in position when the wing pivot locking mechanism is unlocked. FIG. 1 illustrates a selective coupling apparatus at box 9 which may be used to selectively connect the pitch commands provided by the pilot through the control stick 10 to either the elevator 13 or the flaps 12 in accordance with the setting of the switch or lever 8.

FIGS. 13 through 16 show an embodiment of a selective connect apparatus. In these Figures, pitch command control rod 50 is moved axially in response to control input from pilot operated switch 8. Rods 51 and 52 are axially moved to control the elevators 13 and flaps 12 respectively in accordance with the setting of the control signal deflection bar 53 which is set by the position of selector rod 54. Plate 55 is provided with an elongated rhomboidal aperture 56 and is mounted on an aircraft frame member 57. A longitudinal slot 58 in the end of control signal deflection bar 53 acts in cooperation with a pin 59 passing through the slot 58 and affixed to a control lever 60 to provide a sliding pivot connection between the control lever 60 and command control rod 50. Elevator and flap control rods 51 and 52 are attached by pins 61 and 62 to control lever 60. The long axis of the rhomboidal aperture 56 is preferably perpendicular to the axes of the various pins 59, 61 and 62.

Control signal deflection bar 53 is directly mounted by bolt 62 at one end of bar 53 to plate 55 and indirectly to the aircraft frame 57 so that bar 53 may pivot about the axis of bolt 62 in response to the axial motion of transversely oriented selector rod 54. Pitch Command Control rod 50 is pivotally attached at one end to pin 59 which in turn is mounted on lever 60 so that pitch commands supplied by a pilot and appearing as longitudinal motions of pitch command rod 50 will cause pin 59 to slide along a path determined by slot 58 and move lever 60.

The elevator control rod 51 is pin connected by pin 61 to one end of the control lever 60 while the flap control rod 52 is pin connected by pin 63 to the other end of lever 60. Pins 61 and 63 extend parallel to the axis of sliding pivot bolt 59 and are of sufficient length that they pass through the rhomboidal aperture 56 and extend through the plate 55. Obviously, these pins may engage the edges of aperture 56 when relative movement of the pins 61 and/or 63 bring them into interference with the plate edges represented by the rhomboidal aperture 56.

In operation, the position of the signal deflection bar 53 is set by selector rod 54 which is driven by an actuator (not shown) controlled by switch 8. Pilot generated motion of the pitch command control rod 50 will cause the sliding pivot pin 59 of the selector control lever 60 to move along a path defined by the slot 58 in the control signal deflection bar 53. If now the control signal deflection bar 53 is in the position shown in FIG. 16, the pin 61 at the end of the selector control lever 60 to which the elevator rod 51 is attached will be located within the acute angle apex of the rhomboidal aperture 56 and unable to move thus fixing the end of the elevator control rod 51 in place and providing a pivot for the selector control lever 60 about pin 61. Any movements imparted to the selector control lever 60 by the pitch command control rod 50 will move the end of the selector control lever 60 to which the flap rod 52 is attached.

Figure 15:
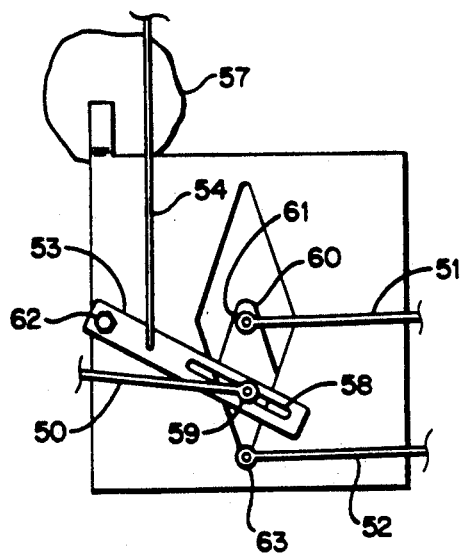
Figure 16:
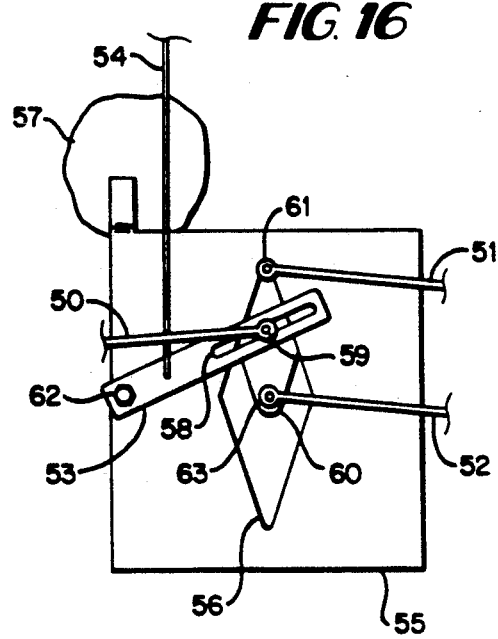

Shifting the control signal deflection bar 53 to the opposite position as shown in FIG. 15 by means of the selector rod 54 will couple the pitch command control rod 50 to the elevator control rod 51 while holding the flap control rod 52 in a fixed position. Note that pitch command control rod 50 is somewhat flexible to permit the vertical movements of pin 59 which are required.

Consequently, by shifting bar 53 between extreme positions in aperture 56, the wing flaps may be controlled and the elevators disengaged for free wing flight and, conversely, the wing flaps may be locked and the elevators controlled for fixed wing flight Of course, in the fixed wing flight mode, the ability to use the flaps may be retained independently of the aforedescribed control system, for example, by a screw-thread vernier system downstream of the aforedescribed control for operating the wing flaps directly.

The apparatus disclosed in FIGS. 13-16 is considered to be only one example of apparatus functioning in a similar manner which might be used. The selector rod 54 may be either driven by an actuator operated by pilot control 8 or a pilot operated lever (also represented by element 8) mechanically connected to the selector rod 54. Other mechanical devices for switching a mechanical input selectively to either of two mechanical outputs might be substituted and the apparatus described above might be modified by shifting the location of the pins on the control lever arm slightly away from the rod attach points, using a rhomboidal aperture having bowed sides, etc. If the aircraft 1 uses a conventional "fly-by-wire" control system, a simple electrical switch or processor utilizing an appropriate control logic might be used in place of mechanical selective coupling apparatus shown in FIGS. 13-16.

Figure 10:
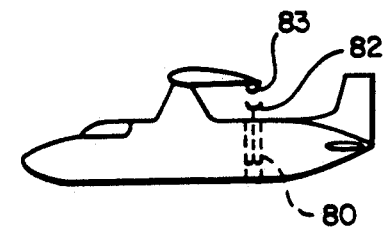
FIGS. 10 and 11 are side elevational views and FIG. 12 is a perspective view of aircraft illustrating further variations of locking devices of the present invention.
Figure 11:
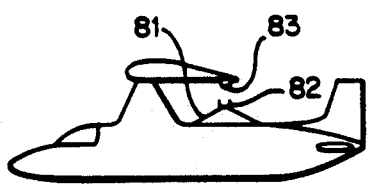

Wing lock mechanisms may take various forms. FIGS. 10 and 11 suggest embodiments where a hydraulic cylinder 80 and jointed leg assembly 81 respectively may lift latch 82 to engage a hook 83 mounted on the wing to lock the wing against rotation about a spanwise pivot axis.

By no means should the embodiments selected for detailed disclosure and the embodiments suggested in FIGS. 10 and 11 be construed to limit the scope of the claims but rather to suggest the variety of mechanisms which can be selected to implement the present invention.

Figure 12:
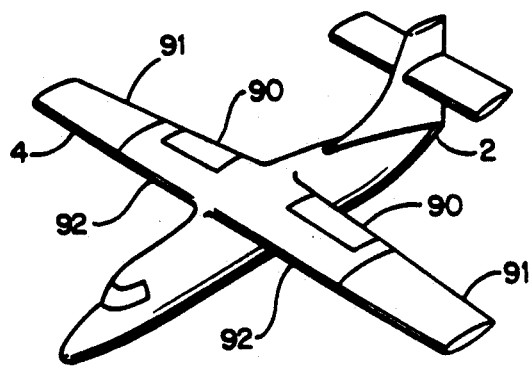
Figure 13:
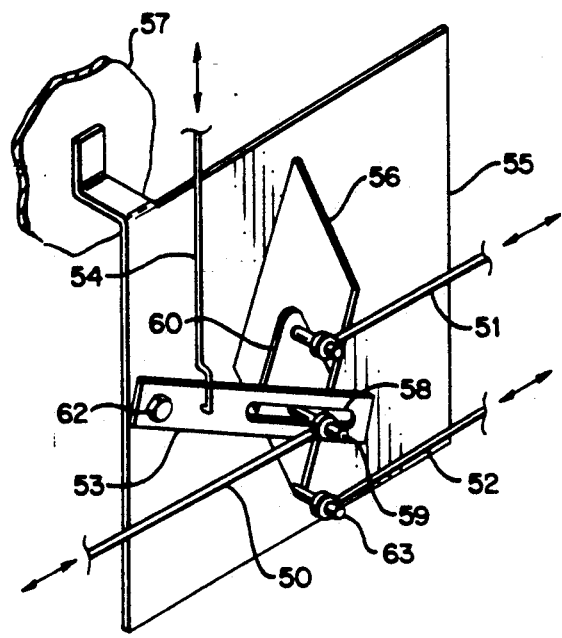
FIGS. 13, 14 and 15-16 are perspective, end and side elevational views, respectively, illustrating an embodiment of a control mechanism for use with the present invention.
Figure 14:
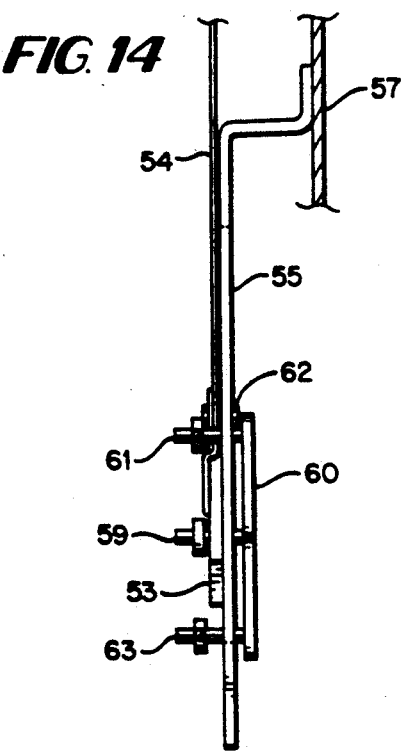

The locking mechanism of the present invention permits new freedom of aircraft design not heretofore attainable. For example, FIG. 12 shows an embodiment where the outer tip portions 91 of the wing 4 comprise a first freewing lift system, while the inner wing portions 92, that is those portions adjacent to the fuselage 2 on either side, comprise a second freewing lift system having means to lock the inner wing portions 92 to the fuselage 2 according to the present invention. Further, a simple lock means may be provided to couple the outer and inner freewing systems to effectively form a single wing, which is particularly advantageous for high speed flight. The wing mounting system shown in FIG. 3, that is, using a bearing supported wing spar, would be modified for mounting the wings of this embodiment by means of concentric spars provided with suitable bearings to thereby couple the wing portions making up each of the freewing systems.

This arrangement has the advantage that the inner freewing system may be locked so that flaps 90 mounted thereon may be used during low speed flight, as for example takeoff and landing. The outer wing portions 91 may be free during landing, thus providing the desirable characteristics of a freewing for a major part of the total lift surfaces of the aircraft even during slow speed flight.

Figure 17:
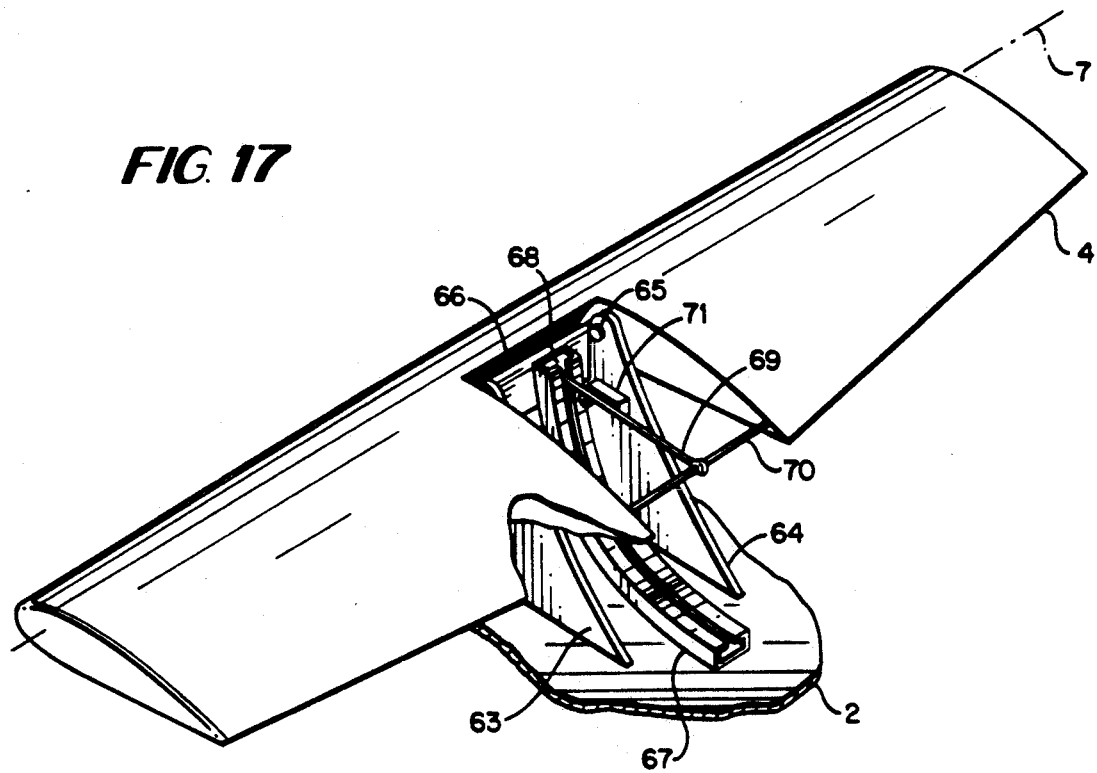
FIG. 17 is a fragmentary perspective view of a still further embodiment of the present invention.

FIG. 17 discloses a lockable free wing where the wing 4 is mounted on a pylon structure comprising right and left pylon elements 63 and 64 and mounted in a manner which may be similar to that used in the embodiment shown in FIG. 7. Pylon elements 63 and 64 are mounted on the aircraft fuselage 2 of which only a small portion is shown in this FIG. The wing 4 may pivot relative to the pylons about axis 7 as permitted by the fastening means employed. As shown in FIG. 17, wing 4 may be mounted to pivot about bolts 65 passing through aligned apertures in the pylon and wing structure.

The upper portions of the pylons may be joined by a cross piece 66 which then conveniently provides a support for the upper end of the curved track 67, the lower end of which track may be affixed to the fuselage 2. It will be seen that the upper end of track 67 is positioned to intersect the pivot axis 7 of the wing 4 so that a follower 68 carried on the end of rod 69 may be selectively placed and geometrically located on the pivot axis 7. Track 67 may comprise a "C" cross section such as might be obtained from rectangular cross section slit in the middle of one of the long web portions. The track is oriented so that the slit web faces the rear wing.

Again referring to FIG. 17, rod 69 pivots about an axis defined by a cross rod 70 which is mounted to wing 4 so that forces transmitted through cross rod 70 act on the wing along a line behind the wing pivot axis 7. Follower 68 may be moved along the track 67 by means of a motor and drive such as a motor and driven friction wheel indicated generally by 71 in this Figure or a motor driven spur gear and engaging teeth on the track 67 similarly as in the embodiment of FIG. 7, or any other suitable means. In FIG. 17, the curved track 67 is shown as having a "C" shape cross section where the follower 68 is retained within the facing ends of the "C": In one simple form, the follower may be made up of rollers carried on bearings mounted on the arms of a "T" where the "T" comprises the arms and the end of rod 69.

When the motor and drive 71 have been used to located the follower 68 so that it is on the wing pivot axis 7 such as is shown in FIG. 17, any pivoting motion of the wing about axis 7 will not apply any tension or compression forces to the rod 69 but will rather merely rotate the follower rollers about their mounting axes at the end of rod 69. However, when the follower 68 is moved to any other position on the track 67, any wing pivoting motion will be resisted by loads carried by the rod 69 and cross rod 70 to the wing 4. For the sake of drawing simplicity, details of the motor and drive 71 have not been shown. A shock absorber may be incorporated into the load carrying elements such as rod 69 which may be of a design similar to the variable length link 17 shown in FIG. 2.

Although the invention has been described with reference to particular means, materials and embodiments, from the foregoing description, one skilled in the art can easily ascertain the essential characteristics of the present invention and various changes and modifications may be made to adapt the various uses and characteristics thereof without departing from the spirit and scope of the present invention as described in the claims which follow.

What is claimed is:

1. An aircraft comprising:
a fuselage;
a wing having an aerodynamic center and connected to said fuselage for free pivotal movement about a spanwise axis forwardly of said aerodynamic center thereby establishing a free wing mode of aircraft operation; and
means for selectively locking said wing at a substantially fixed predetermined angle of incidence with respect to said fuselage to thereby terminate said free wing mode and selectively establish a fixed wing mode of aircraft operation during flight and on the ground.

2. An aircraft according to claim 1, wherein said locking means includes a locking mechanism for locking said wing at selected angles of incidence relative to said fuselage.

3. An aircraft according to claim 1 wherein said locking means cooperates between said fuselage and said wing.

4. An aircraft according to claim 1 including means for selectively unlocking said wing at said predetermined angle of incidence relative to said fuselage whereby said wing is freely pivotal relative to said fuselage.

5. An aircraft according to claim 4 wherein said locking means and said unlocking means are operable during aircraft flight to enable in-flight transition between freewing and fixed wing modes of flight.

6. An aircraft according to claim 1 wherein said wing is connected to said fuselage such that the angle of attack of the wing is determined solely by aerodynamic forces and presents a substantially constant angle of attack to relative wind.

7. An aircraft comprising:
a fuselage;
a wing having an aerodynamic center and connected to said fuselage for free pivotal movement about a spanwise axis forwardly of said aerodynamic center thereby establishing a free wing mode of aircraft operation; and
means for selectively locking said wing at a substantially fixed predetermined angle of incidence with respect to said fuselage to establish a fixed wing mode of aircraft operation, wherein said locking means includes a fluid actuated cylinder.

8. An aircraft comprising:
a fuselage;
a wing having an aerodynamic center and connected to said fuselage for free pivotal movement about a spanwise axis forwardly of said aerodynamic center thereby establishing a free wing mode of aircraft operation; and
means for selectively locking said wing at a substantially fixed predetermined angle of incidence with respect to said fuselage to establish a fixed wing mode of aircraft operation, wherein said locking means includes a screw mechanism.

9. An aircraft comprising:
a fuselage;
a wing having an aerodynamic center and connected to said fuselage for free pivotal movement about a spanwise axis forwardly of said aerodynamic center thereby establishing a free wing mode of aircraft operation; and
means for selectively locking said wing at a substantially fixed predetermined angle of incidence with respect to said fuselage to establish a fixed wing mode of aircraft operation, wherein said aircraft has an elevator on said fuselage and a control system for said aircraft for controlling said elevator, and means for disengaging said elevator control system.

10. An aircraft comprising:
a fuselage;
a wing having an aerodynamic center and connected to said fuselage for free pivotal movement about a spanwise axis forwardly of said aerodynamic center establishing a first free wing mode of aircraft operation; and
a locking mechanism for selectively locking said wing at a predetermined angle of incidence with respect to said fuselage establishing a second fixed wing mode of aircraft operation, said locking mechanism including a damper for damping the pivotal movement of said wing relative to the fuselage during transition of the aircraft between said first and second modes of operation.

11. An aircraft according to claim 10, wherein said wing locking mechanism further comprises means for positioning said damper between a first position wherein said damper does not transfer any motional forces between said fuselage and said wing, and a second position wherein said damper locks said fuselage and said wing to one another.

12. An aircraft according to claim 11, wherein said positioning means comprises a curved track carried by said aircraft and having an axis non-coincident with said wing pivot axis, means for coupling said wing and said curved track with said coupling means being movable along said track, and means for driving said coupling means along said curved track to lock said fuselage and said wing at said predetermined angle of incidence.

13. An aircraft according to claim 11, wherein said positioning means comprises a rod carried by said wing and a shuttle block movable along said rod, said damper being connected to said shuttle block, and means for driving said shuttle block along such rod.

14. An aircraft according to claim 13, wherein said shuttle block includes a threaded bore and said rod is threaded and connected to said threaded bore, said drive means comprising a motor which reversibly rotates said threaded rod.

15. An aircraft according to claim 10, wherein said damper comprises a fluid cylinder.

16. An aircraft according to claim 15, further comprising a movable piston positioned within said fluid cylinder and having a piston rod, said fluid cylinder being pivotally attached to said fuselage at one end thereof, and said piston rod being attached to said wing.

17. An aircraft according to claim 10 wherein said wing is connected to said fuselage such that the angle of attack of the wing is determined solely by aerodynamic forces and presents a substantially constant angle of attack of relative wind.

18. In an aircraft having a free wing, a method of aircraft operation comprising the steps of:
operating the aircraft in a free wing mode; and
locking the free wing during flight at a predetermined angle of incidence relative to said fuselage for aircraft operation in a fixed wing mode, wherein the aircraft has a fuselage, a horizontal stabilizer and elevators on said stabilizer, and including the step of disabling the elevators during flight in the free wing flight mode.

19. In an aircraft having a free wing, a method of aircraft operation comprising the steps of:
operating the aircraft in a free wing mode; and
terminating said free wing mode by locking the free wing during flight at a predetermined angle of incidence relative to said fuselage for aircraft operation in a fixed wing mode.

20. A method according to claim 19 wherein the step of locking said free wing is accomplished at aircraft speeds comparable to those aircraft speeds at landing or take-offs.

21. In an aircraft having a free wing, a method of aircraft operation comprising the steps of:
operating the aircraft in a fixed wing mode with the free wing locked at a predetermined angle of incidence relative to said fuselage; and
terminating said fixed wing mode by unlocking the free wing during flight in said fixed wing mode for aircraft operation in a free wing mode.

22. A method according to claim 21 including locking the free wing during flight in said free wing mode at a predetermined angle of incidence relative to said fuselage for aircraft operation in a fixed wing mode.

* * * * *